United States Patent
Hilgier et al.

(10) Patent No.: US 10,337,500 B2
(45) Date of Patent: Jul. 2, 2019

(54) RELEASE MECHANISM

(71) Applicant: Hamilton Sundstrand Corporation, Charlotte, NC (US)

(72) Inventors: Artur Hilgier, Wroclaw (PL); Marek Wit, Jawor (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 132 days.

(21) Appl. No.: 15/668,781

(22) Filed: Aug. 4, 2017

(65) Prior Publication Data
US 2018/0038349 A1 Feb. 8, 2018

(30) Foreign Application Priority Data
Aug. 4, 2016 (EP) .................................... 16461546

(51) Int. Cl.
| | |
|---|---|
| *F03D 13/20* | (2016.01) |
| *F03D 9/32* | (2016.01) |
| *B64D 41/00* | (2006.01) |
| *F15B 15/26* | (2006.01) |

(52) U.S. Cl.
CPC ........... *F03D 13/20* (2016.05); *B64D 41/007* (2013.01); *F03D 9/32* (2016.05); *B64D 2041/002* (2013.01); *F05B 2220/31* (2013.01); *F05B 2220/50* (2013.01); *F05B 2240/923* (2013.01); *F05B 2260/30* (2013.01); *F15B 15/261* (2013.01)

(58) Field of Classification Search
CPC .......... B64D 1/06; B64D 1/16; B64D 41/007; F03D 9/00; F16D 1/00; F16D 1/12; F01D 25/28; Y10T 403/32254; Y10T 403/32262; Y10T 403/32271
See application file for complete search history.

(56) References Cited

U.S. PATENT DOCUMENTS

| | | | |
|---|---|---|---|
| 2,448,548 A * | 9/1948 | Purdy .................... | F16B 7/20 403/341 |
| 3,901,156 A | 8/1975 | Rognmo et al. | |
| 7,296,970 B2 | 11/2007 | Bannon et al. | |
| 8,262,311 B2 * | 9/2012 | Trice .................... | B25G 1/04 403/109.3 |
| 9,205,928 B2 | 12/2015 | Russ | |
| 9,366,315 B2 * | 6/2016 | Tylaska ................. | F16G 11/10 |

(Continued)

OTHER PUBLICATIONS

European Search Report for EP Application No. 16461546.0-1754 dated Feb. 2, 2017.

*Primary Examiner* — Daniel J Wiley
(74) *Attorney, Agent, or Firm* — Cantor Colburn LLP

(57) ABSTRACT

A release mechanism comprises a locking body mounted for reciprocating movement in a first axial direction between a locked position and a released position. A force transmitting element is coupled to the locking body for transmitting a force (F) to the locking body for moving the locking body from the locked position to the released position. A biasing element acts on the locking body in a direction for moving the locking body from the released position to the locked position. The locking body comprises a slot having a first slot portion extending in said first direction, and a second slot portion extending transversely from one side of said first slot portion at an end thereof. The slot slidably receives an actuating element therein.

16 Claims, 9 Drawing Sheets

(56) References Cited

U.S. PATENT DOCUMENTS

2013/0078026 A1 3/2013 Sasscer et al.
2013/0327207 A1 12/2013 Sasscer et al.
2013/0327885 A1 12/2013 Sasscer
2013/0330121 A1 12/2013 Sasscer et al.

* cited by examiner

RELEASE MECHANISM

FOREIGN PRIORITY

This application claims priority to European Patent Application No. 16461546.0 filed Aug. 4, 2016, the entire contents of which is incorporated herein by reference.

TECHNICAL FIELD

The present disclosure relates to release mechanisms, in particular but not exclusively, to release mechanisms for Ram Air Turbines (RATs).

BACKGROUND

Ram Air Turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a locking mechanism which prevents inadvertent movement of the piston and thus inadvertent deployment of the RAT. The locking mechanism typically comprises a spring loaded lock piston which must be moved in an axial direction to release the actuator. Such a mechanism is disclosed for example in US 2013/0327207 A1.

A release mechanism is provided to permit this movement. Typically, the release mechanism comprises a toggle type linkage one end of which is rotatably coupled to one end of the locking piston and the other end of which is axially fixed and rotatably coupled to a support. A linear solenoid moves the linkage between a locked and an unlocked position. However, in moving between the two positions, the linkage must go "over centre" and initially displace the lock piston against the force of the lock piston spring, which means that a relatively large solenoid may be necessary. Also, the toggle mechanism may comprise multiple components which must be assembled with tight tolerances, thereby complicating assembly

SUMMARY

Disclosed herein is a release mechanism comprising a locking body mounted for reciprocating movement in a first axial direction between a locked position and a released position, and a force transmitting element coupled to the locking body for transmitting a force to the locking body for moving the locking body from the locked position to the released position. The mechanism further comprises a biasing element acting on the locking body in a direction for moving the locking body from the released position towards the locked position. The locking body comprises a slot comprising a first slot portion extending in said first direction, and a second slot portion extending transversely from one side of said first slot portion at an end thereof. The slot slidably receives an actuating element therein. The actuating element is movable in a second direction transverse to said first axial direction and is received in the second slot portion when the locking body is in the locked position and in the first slot portion when the locking body is in the released position.

The second slot portion may comprise a first axially facing wall extending transversely from a first wall of the first slot portion and an opposed second axially facing wall extending from an end of the first slot portion.

The first axially facing wall of the second slot portion may forms an angle with the first wall of the first slot portion of less than or equal to 90°.

The second axially facing wall of the second slot portion may extend at an angle of greater than 90° relative to a second wall of the first slot portion opposite the first wall of the first slot portion.

The second axially facing wall of the second slot portion may join the second wall of the first slot portion through a smooth curve.

The actuating element may comprise a rod having a circular cross section, the diameter of the rod being less than twice the depth of the second slot portion.

The mechanism may further comprise a spring loaded element, for example a ball, mounted for engagement with the actuating element when the actuating element is received in the second slot section.

The spring loaded element may be mounted in an end wall of the first slot portion.

The mechanism may further comprise guides for guiding the actuating element in its movement transverse to the first axial direction.

The mechanism may further comprise a housing slidably mounting the locking body. The housing may comprises a pair of opposed slots receiving opposed ends of the actuating element.

The force transmission element may extend through a first wall of the housing.

The biasing element may be a compression spring mounted between a second wall of the housing and the locking body.

The mechanism may comprise a rod attached to said locking body and extending through the second wall of the housing, the compression spring being a coil spring mounted around the rod.

The mechanism may further comprise at least one actuator attached to the actuating element for moving the actuating element in the second, transverse direction.

The disclosure also provides a ram air turbine release mechanism comprising a spring biased locking piston movable between a first position in which the ram air turbine is held in a retracted position and a second position which releases the ram air turbine. The ram air turbine release mechanism further comprises a disclosed release mechanism as discussed in any of the preceding paragraphs, the locking piston being coupled to the force transmission element of the release mechanism.

BRIEF DESCRIPTION OF DRAWINGS

An embodiment of the disclosure will now be described by way of example only, with reference to the accompanying drawings in which.

DETAILED DESCRIPTION

Figure 1:
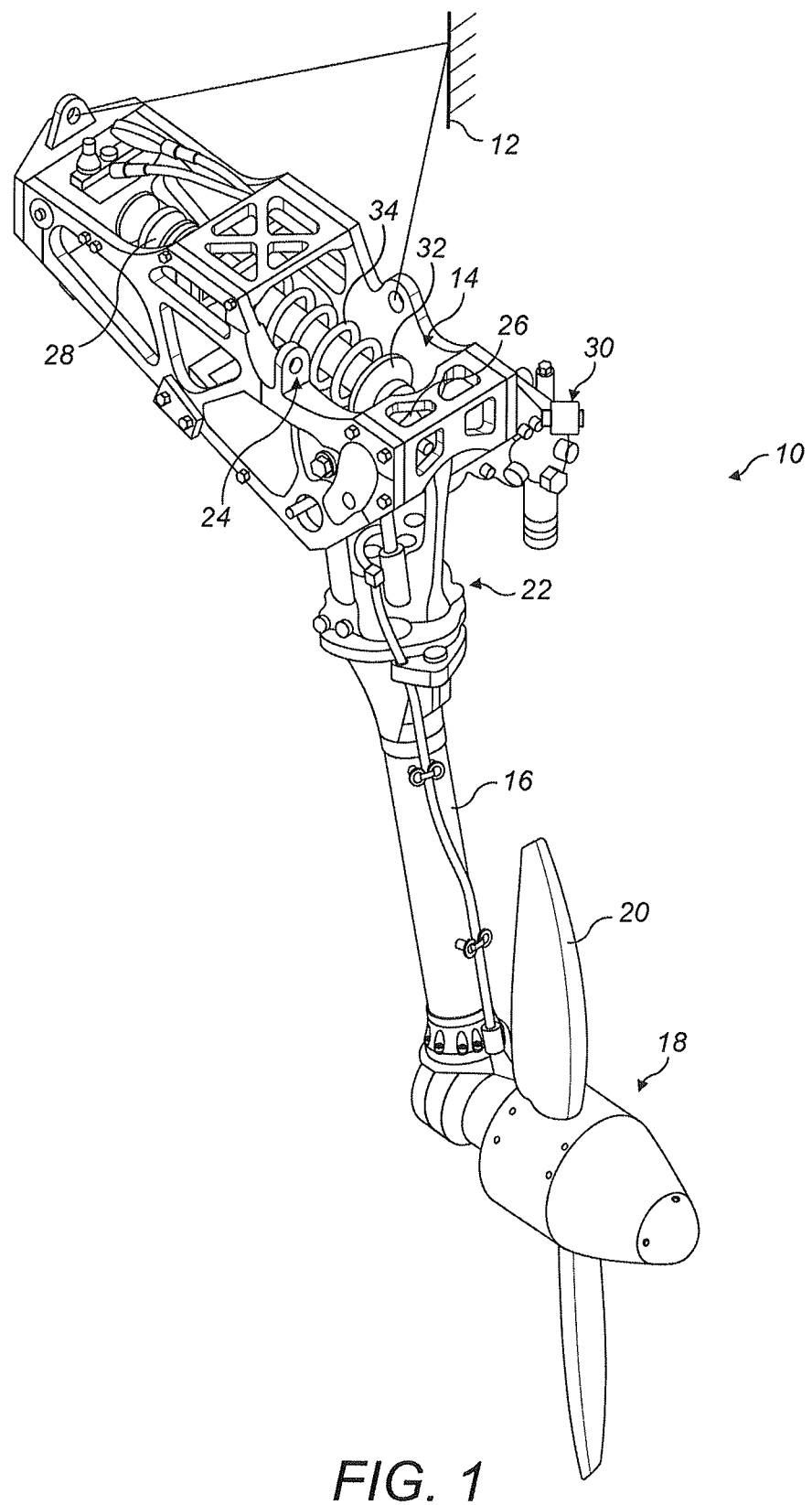
FIG. 1 shows a ram air turbine.

FIG. 1 illustrates an RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIGS. 2 to 6.

Figure 2:
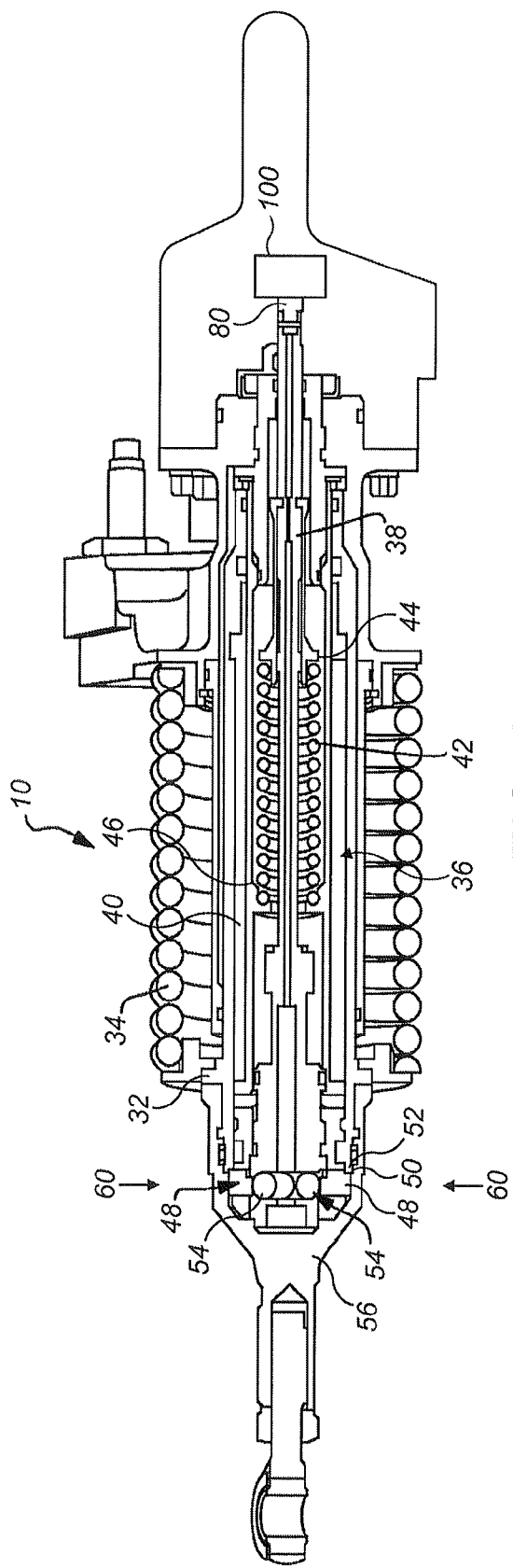
FIG. 2 shows, some detail of the ram air turbine of FIG. 1.
Figure 3:
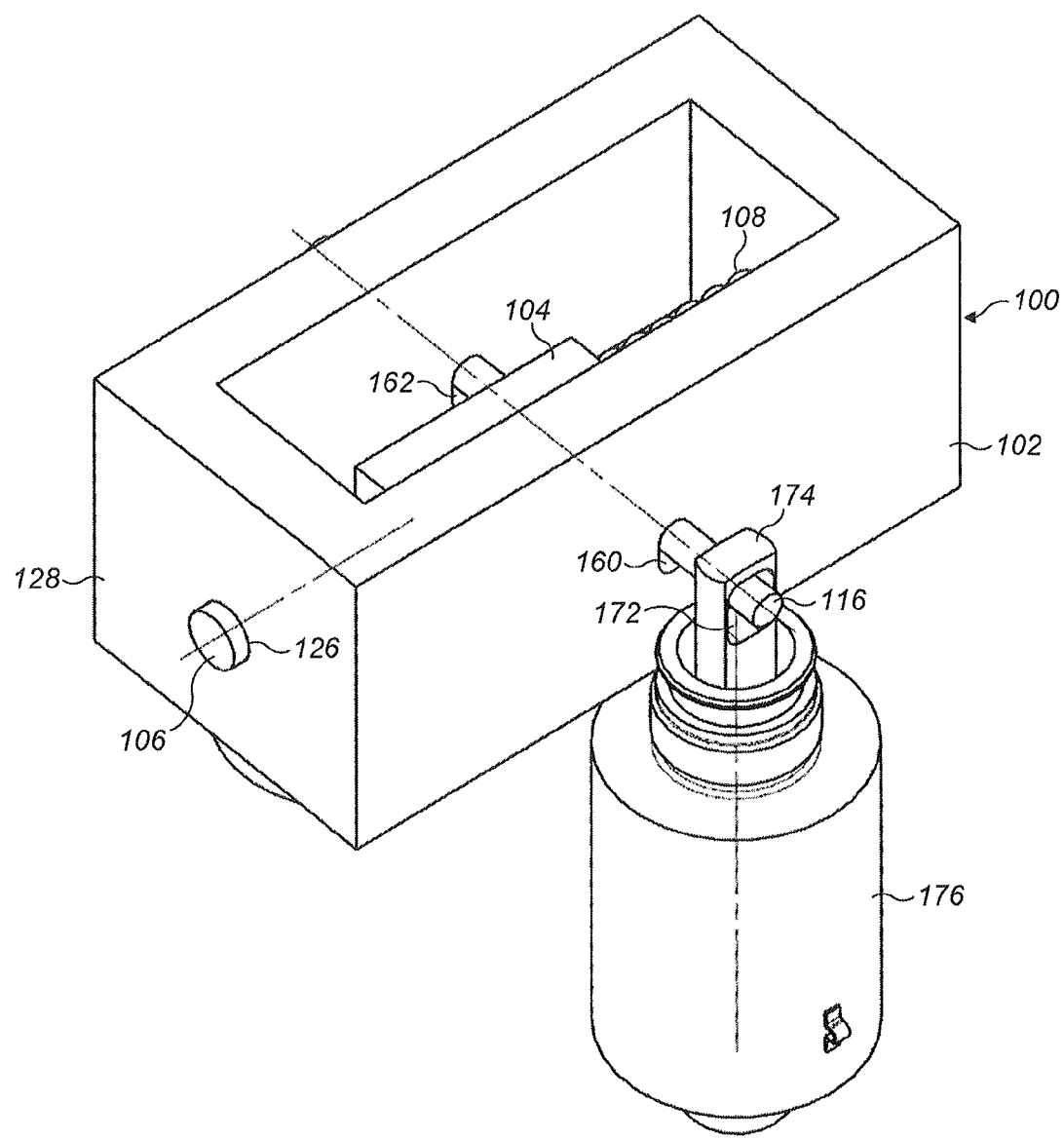
FIG. 3 shows, schematically, a perspective view of a release mechanism for use with the ram air turbine of FIGS. 1 and 2.
Figure 4:
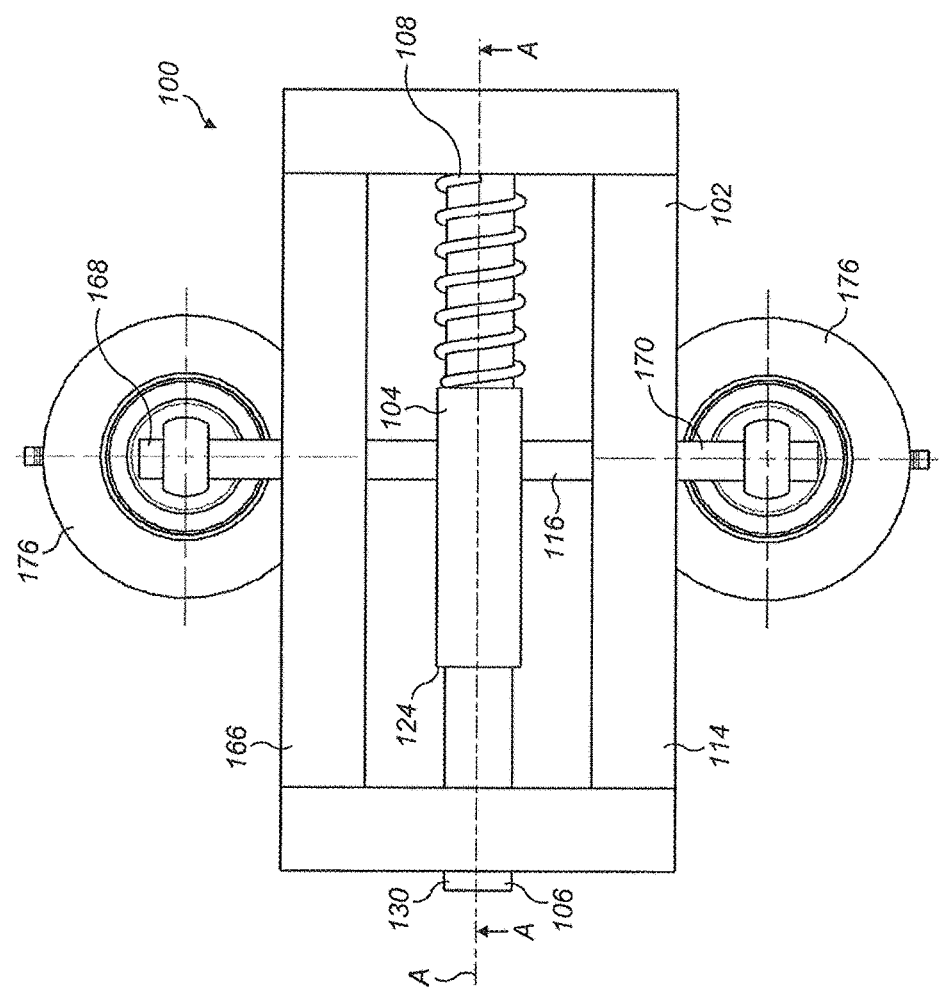
FIG. 4 shows a plan view of the release mechanism of FIG. 3.
Figure 5:
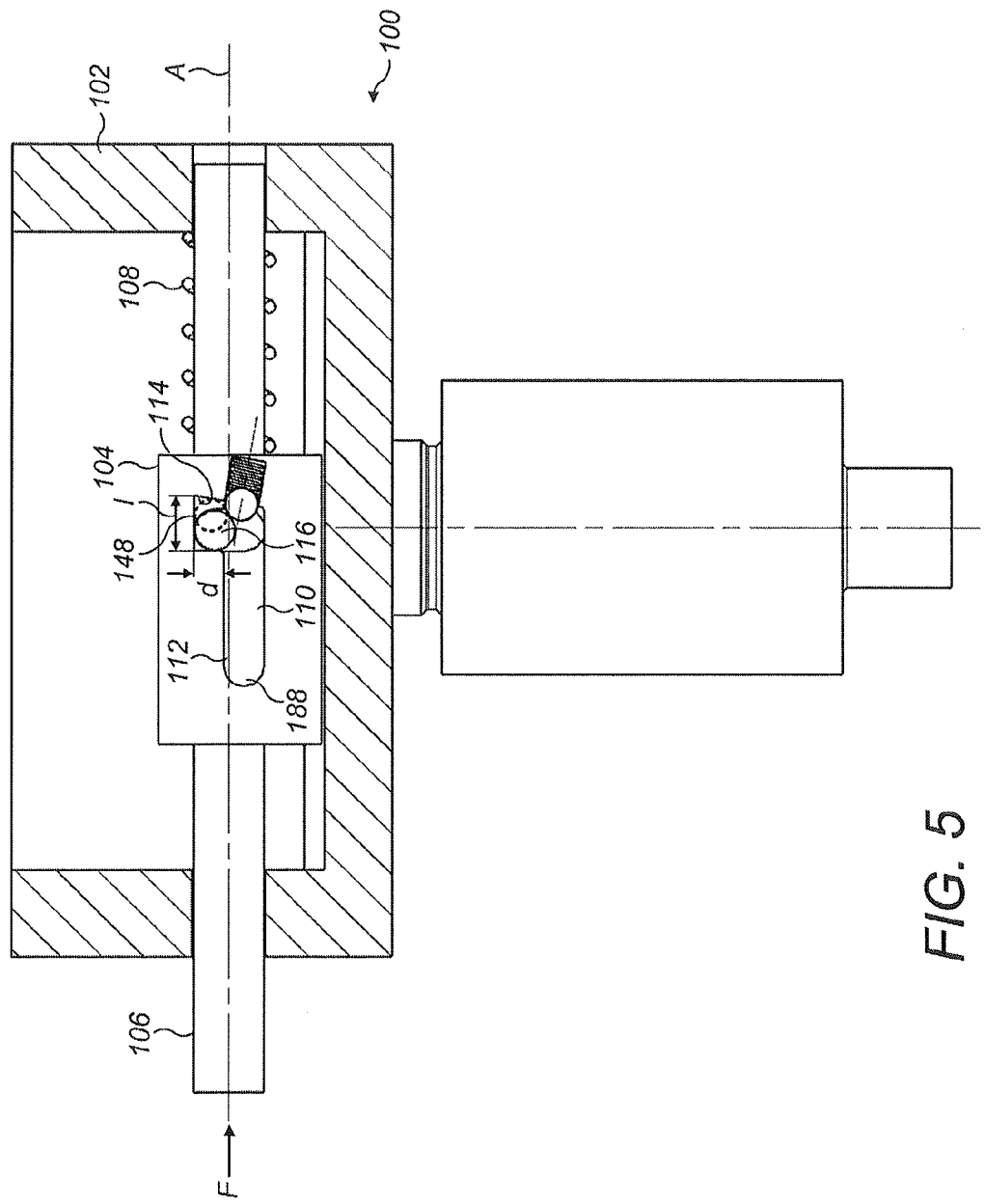
FIG. 5 shows the release mechanism in a locked position.

With reference to FIG. 2, the locking mechanism 36 comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58 under the force of the biasing spring 42, the wedges 48 may displace in the direction of arrows 60 thereby disengaging the shoulders 50, 52 and allowing the cylinder 32 to extend to deploy the RAT. This general type of locking mechanism is known in the art and is discussed in some detail, for example in US 2013/0330121 A1 and US2013/0327885 A1.

To unlock the locking mechanism, the distal end 80 of the locking piston 38 is attached to a release mechanism 100 illustrated only schematically in FIG. 2. In essence, as will be described further below, the release mechanism is movable between a locking position in which it retains the locking piston 38 in the position shown in FIG. 2 and a released position in which it permits the locking piston 38 to move to the right under the force of the spring 42, move the rollers 56 of the locking piston 38 out of alignment with the locking surfaces of the locking wedges 48, thereby allowing deployment of the actuator cylinder 32.

Figure 7:
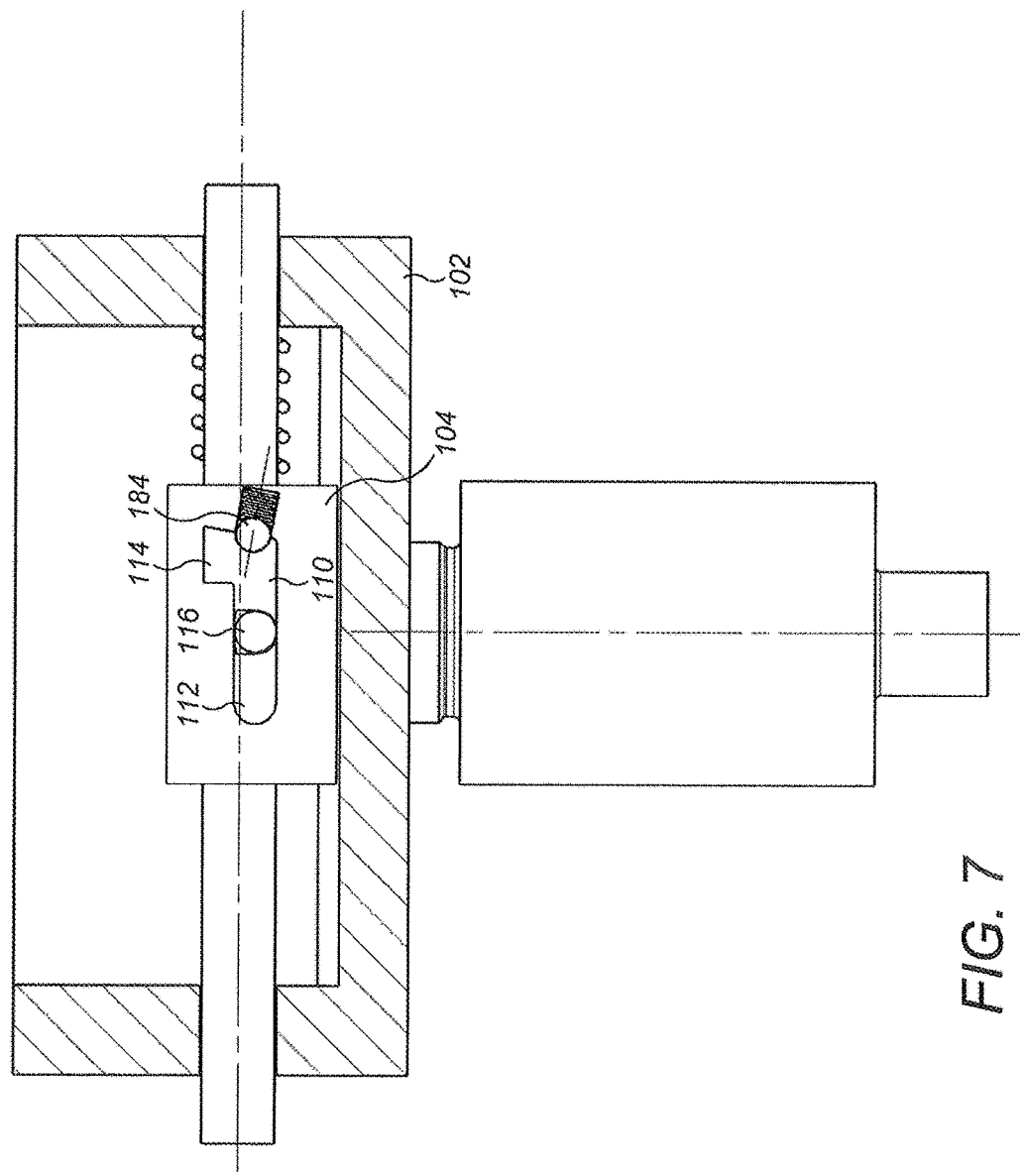
FIG. 7 shows the release mechanism in an intermediate position.
Figure 8:
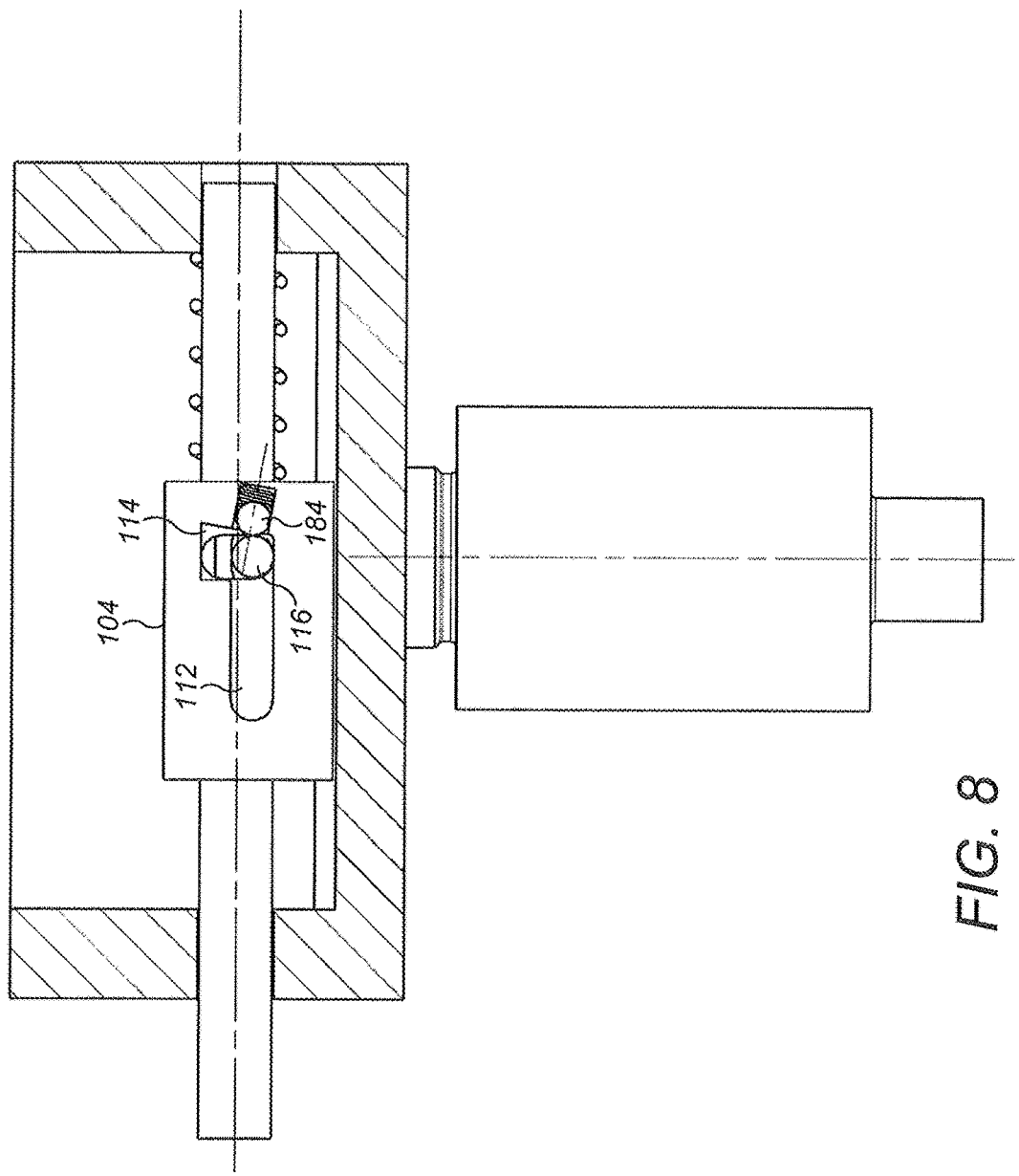
FIG. 8 shows the release mechanism in a further intermediate position.
Figure 9:
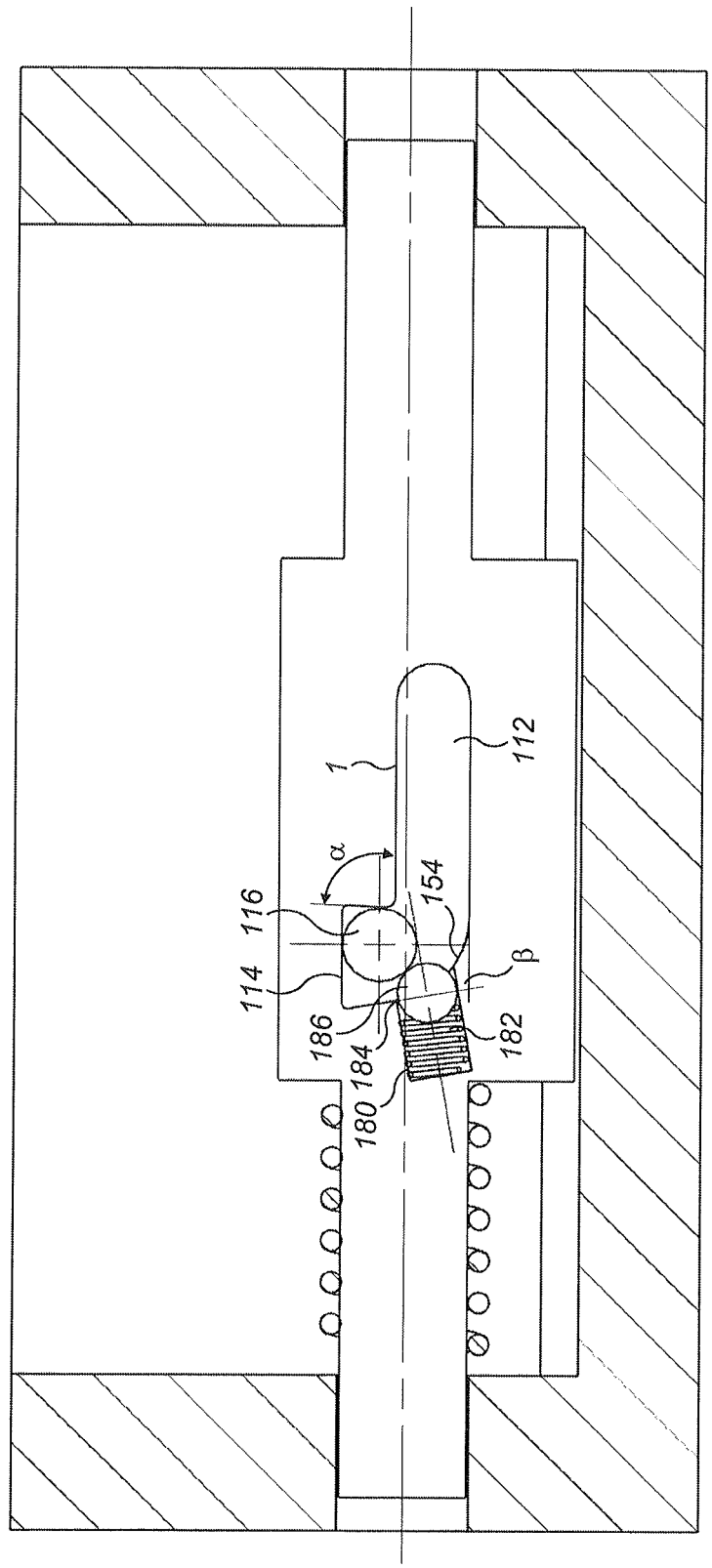
FIG. 9 shows an alternative embodiment of release mechanism.

A release mechanism in accordance with an embodiment of the disclosure will now be described primarily with reference to FIGS. 3 to 8 and with occasional reference to FIG. 9.

In broad terms, the release mechanism 100 comprises a housing 102 which slidably mounts a locking body 104 for reciprocating movement along an axis A. A force transmitting element 106 is coupled to the locking body for transmitting a force to the locking body 104 for moving the locking body 104 from a released position (shown in FIG. 4) to a locked position (shown in FIG. 5). A biasing element 108 acts on the locking body 104 in a direction for moving the locking body 104 from the released position to the locked position.

The locking body 104 comprises a slot 110 having a first slot section 112 extending in a first direction along the axis A and a second slot section 114 extending transversely from one side of the first slot section 112 at an end thereof.

An actuating element 116 is received in the slot 110, being received in the second slot section 114 when the locking body 104 is in the locked position and in the first slot section 112 when the locking body 104 is in the released position.

In more detail, in this embodiment, the locking body 104 is formed as a rectilinear block which is slidably received in a groove 120 formed in a base wall 122 of the housing 102 to assist in guiding the locking body 104 in a reciprocating movement in the housing 102. This is of course just an exemplary arrangement and other equivalent means may be provided, for example a rib on the base wall 122 and a groove provided on the locking body 104.

The force transmission element 106 is suitably coupled to a first axial end 124 of the locking body 104. In some embodiments, the force transmission element 106 may be formed integrally with the locking body 102. In other embodiments, the force transmission element 106 may be a separate element suitably attached to the locking body 102, for example through a threaded coupling.

The force transmission element 106 is a generally cylindrical rod, of circular cross section. Other cross sectional shapes may also be used within the scope of the disclosure. The force transmission element 106 extends through an opening 126 formed in a first end wall 128 of the housing 102. The free end 130 of the force transmission element 106 is suitably attached to an element of the system to be locked or released by the mechanism 100. For example, in a ram air turbine application as described above, the free end 130 of the force transmission element 106 may be coupled to the locking piston 38 of the actuator, for example abutting an end of that locking piston 38.

The biasing element 108 is arranged between a second axial end 132 of the locking body 104 and a second end wall 134 of the housing 102, opposite the first end wall 128. In this embodiment, the biasing element is a compression spring, in particular a coil spring. However, other types of spring may be used. For example, a tension spring could be provided between the first end wall 128 of the housing 102 and the first end 124 of the locking body 104. Other biasing arrangements will be readily apparent to the skilled reader.

The compression spring 108 is mounted around a rod 136 which is suitably coupled to the second axial end 132 of the locking body 102. In some embodiments, the rod 136 may be formed integrally with the locking body 102. In other embodiments, the rod 136 may be a separate element suitably attached to the locking body 102, for example through a threaded coupling.

The rod 136 has a circular cross section in this embodiment. Other cross sectional shapes may also be used within the scope of the disclosure. The rod 136 extends through an opening 138 formed in the second end wall 134 of the housing 102. The rod 136 serves to mount the spring 106, but also assists in the guidance of the locking body 104 along the axis A. In this embodiment, the rod 136 and force transmission element 106 are coaxial, but offset configurations also fall within the scope of this disclosure.

The free end 130 of the force transmission element 106 is suitably coupled to an element of the system to be locked or unlocked by the mechanism 100. For example, in the ram air turbine arrangement discussed above, the free end 130 may be coupled to the distal end 80 of the locking piston 38, for example abutting the distal end 80 of the locking piston 38.

As discussed above, the locking body 104 has a slot 110 formed therein. In this embodiment the slot 110 is a through slot 110 extending from one side of the locking body 104 to the opposed side. The slot 110 has a first slot portion 112 which extends in the axial direction, i.e. parallel to the axis of movement A of the locking body 104. The slot 110 also has a second slot portion 114 which extends transversely from a first wall 140 of the first slot portion 112 at an end of the first slot portion 112.

The second slot portion 114 comprises a first axially facing wall 142 extending transversely from the first wall 140 of the first portion 112 of the slot 110 and an opposed second axially facing wall 144. The second axially facing wall 144 extends to a second wall 146 of the first slot portion 112.

The second slot portion 114 has a depth d measured from the first wall 140 of the first slot portion 112 to its base wall 148 and has a length l1 at its base wall 148 and a length l2 at the first wall 140 of the first slot portion 112. The base wall 148 is in this embodiment parallel to the first wall 140 of the first portion 112, but other configurations also fall within the scope of the disclosure.

The first axially facing wall 142 of the second slot portion 114 forms an angle α with the first wall 140 of the first slot portion 112. The angle α is in this embodiment 90°. In other embodiments, for example as illustrated in FIG. 9, however, the angle α may be a little less than 90°, for example 89°. This forms a corner 150 between the first axially facing wall 142 of the second slot 114 and the base wall 148 thereof which has an included angle of less than or equal to 90°. The included angle should not be so acute as to require too large a force to dislodge the actuating element 116 from the corner 150.

The second axially facing wall 144 of the second slot portion 114 forms an angle β with the second wall 146 of the first slot portion 112. The angle β is greater than 90°, for example greater than 110°, for example 120°. In this embodiment, the second axially facing wall 144 of the second slot portion 114 meets the second wall 146 of the first slot portion 112 at a relatively sharp corner 152, but in other embodiments, the corner 152 may be chamfered, or, for example as shown in FIG. 9, the walls 144, 146 may join at a smooth curved portion 154. Such an arrangement may be advantageous as it promotes smooth movement of the actuating element 116 along the slot 110.

The actuating element 116 extends through the slot 110 and projects outwardly through opposed slots 160, 162 formed in opposed side walls 164, 166 of the housing 102. The housing slots 160, 162 are sized so as to permit movement of the actuating element 116 only in the transverse direction.

The ends 168, 170 of the actuating element 116 are received in slots 172 formed in plungers 174 of linear actuators 176, for example solenoid actuators 176. These actuators 176, as will be explained further below, will move the actuating element 116 to effect a release movement of the mechanism 100.

The actuating element 116 has a diameter D which is smaller than the depth of the first slot portion 112 so that it may move therealong. Also, the diameter D is, in this embodiment, less than two times the depth d of the second slot portion 112. This means that the centre of the actuating element 116 will lie above the first wall 140 of the first slot portion 112 when the actuating element 116 is received within the second slot portion 114.

Returning to the locking body 104, a bore 180 is formed in the second axially facing wall 144 for receiving a compression spring 182 and a ball 184. The ball 184 may be retained in the bore 182 by suitable means such as a reduced diameter retaining lip 186 provided at the mouth of the bore 180. The ball 184 is biased outwardly such that it projects into the end of the first slot portion 112. The degree of projection is such that when the actuating element 116 is in contact with the first axially facing wall 142 of the second slot portion 114, it contacts the actuating element 116, as shown, for example in FIG. 6. As will be explained further below, this engagement will assist in retaining the actuating element 116 within the second slot portion 114. The ball 184 may, as shown, be biased in a direction towards the second slot portion 114 to assist this retention.

Having described the structure of the mechanism, its operation will now be described.

As discussed above, in use, the force transmitting element 106 is coupled to a system to be locked or unlocked. In the particular context of a ram air turbine as described, it may be acted on by an end of a locking piston 38. As disclosed, the ram air turbine is locked in a retracted position by the locking piston 38. When in this position, the locking piston 38 will be biased by the actuating spring 42, thereby exerting a force F on the force transmitting element 106. In this condition, the release mechanism 100 is in the condition shown in FIG. 6.

In this state, the actuating element 116 is positioned in the second slot portion 114, thereby blocked the locking body 104 from moving axially, due to the engagement of the actuating element 116 on the first axially facing wall 140 of the second slot portion 114. The force F will be greater than the force of the spring 108, ensuring engagement of the actuating element 116 with the first axially facing wall 140 of the second slot portion 114. The actuating element 116 cannot move axially since it is prevented from doing so by the slots 160, 162 in the housing 102. The centre of the actuating element 116 lies below the upper edge of the first axially facing wall 140, thereby firmly retaining the actuating element in contact with the first axially facing wall 140. The ball 184 may also assist in retaining the actuating element 116 in position.

Figure 6:
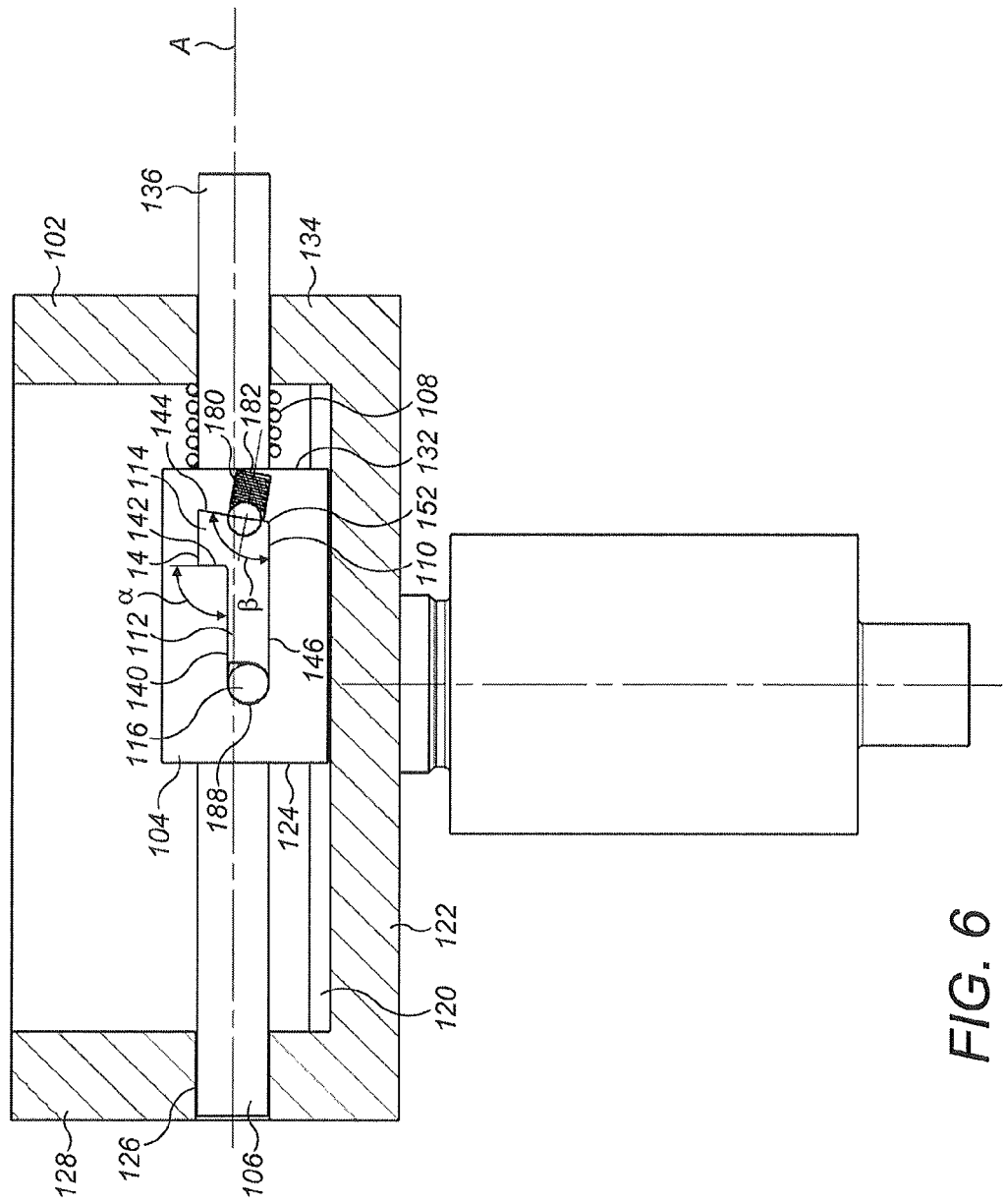
FIG. 6 shows the release mechanism in an release position.

When it is desired to deploy the ram air turbine, the solenoid actuators 176 are activated, pulling the actuating element 116 downwardly (in the sense of the figures). This moves the actuating element 116 out of the second slot portion 114 and into the first slot portion 112. As the force F is greater than the biasing force of the spring 108, the locking body 104 will move axially under the force F until the actuating element 116 reaches the end 188 of the first slot portion 112, as shown in FIG. 6. The force transmitting element 106 moves with the locking body 104, thereby allowing movement of the actuator locking piston 38, thereby releasing the ram air turbine actuator, to permit deployment of the ram air turbine.

At the same time, the spring 108 is compressed against the second end wall 134 of the housing 102, again as shown in FIG. 6. The solenoid actuators 176 can be deactivated. The slots 172 in the actuator plungers 174 will allow the actuators 176 to return to their original positions.

When it is required to stow the ram air turbine, a further actuator (not shown) will retract the locking piston 38 of the ram air turbine actuator. As illustrated in FIG. 7, this will allow the locking body 104 to move to the left (in the sense of the Figures) under the force of the spring 108. When the actuating element 116 reaches the end wall 144 of the first slot portion 112, as illustrated in FIG. 8, it will be moved into the second slot portion 114 due to the inclination of the end wall 144 of the first slot portion 112. In an alternative embodiment, alternatively or additionally, other means may be used to facilitate this movement, for example a spring element arranged below the second slot portion 114.

The actuating element 116 will be held against the second axially facing wall 144 of the second slot portion 114 under the biasing force of the spring 108. This position is shown in dotted lines in FIG. 5. The actuating element 116 will be biased upwardly into the second slot portion 114 by the ball 184.

When the ram air turbine has been stowed, the locking piston 38 is once more subjected to the biasing force of the actuator spring 42, which once more biases the force transmission element 106 in an axial direction. Since, as discussed above, that force is greater than the biasing force of the spring 108, the locking body 104 will move slightly axially in the direction of the force F so as to bring the locking body 104 back to the locked position shown in FIG. 5, with the actuating element 116 in engagement with the first axially facing wall 142 of the second slot portion 114. As discussed above, the actuating element 116 will be firmly retained in this position until the actuators 176 are next activated.

It will be seen that during the movement of the locking body 104 between the two positions described above, the actuating element 116 will disengage from both the first and seconds axially facing walls 142, 144 of the second slot portion 114. If the movement were to be slow, then there is a possibility that the actuating element 116 might fall out of the second slot portion 114 into the first slot portion 112, resulting in premature release of the mechanism 100. To avoid this possibly remote eventuality, the ball 184 biases the actuating element 116 into the second slot portion 114 throughout this movement. The ball 184 may also assist in preventing inadvertent disengagement of the actuating element 116 from the second slot portion 114 in use, for example due to vibration.

The embodiment described above may be advantageous in a number of respects. The actuating movement required of the actuating element 116 can be made relatively small, while at the same time permitting reliable operation of the mechanism 100. This may allow smaller solenoids 176 to be employed. Also, the manufacturing and assembly of the mechanism may be simpler than previous mechanisms.

While the release mechanism 100 has been described in the context of a ram air turbine, it is not limited to such and the mechanism 100 may be used in any installation which requires a release mechanism.

It will also be understood that modifications may be made to the specific embodiment disclosed without departing form the scope of the disclosure. For example, the locking body 104 need not be rectilinear and could, for example, be cylindrical, with a slot formed therein. The locking body 104, force transmission element 106 and rod 136 could be formed as a unitary cylindrical body.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A release mechanism comprising:
   a locking body mounted for reciprocating movement in a first axial direction between a locked position and a released position;
   a force transmitting element coupled to the locking body for transmitting a force (F) to said locking body for moving the locking body from the locked position to the released position; and
   a biasing element acting on the locking body in a direction for moving the locking body from the released position towards the locked position;
   said locking body comprising a slot comprising a first slot portion extending in said first direction, and a second slot portion extending transversely from one side of said first slot portion at an end thereof; and
   said slot slidably receiving an actuating element therein, said actuating element being:
      movable in a second direction transverse to said first axial direction,
      received in said second slot portion when the locking body is in the locked position, and
      received in said first slot portion when the locking body is in the released position.

2. The release mechanism as claimed in claim 1, wherein said second slot portion comprises a first axially facing wall extending transversely from a first wall of said first slot portion and an opposed second axially facing wall extending from an end of the first slot portion.

3. A release mechanism as claimed in claim 2, wherein said first axially facing wall of said second slot portion forms an angle ($\alpha$) with said first wall of said first slot portion of less than or equal to 90°.

4. The release mechanism as claimed in claim 2, wherein said second axially facing wall of said second slot portion extends at an angle ($\beta$) of greater than 90° relative to a second wall of said first slot portion opposite the first wall of the first slot portion.

5. The release mechanism as claimed in claim 4, wherein said second axially facing wall of said second slot portion joins said second wall of said first slot portion through a smooth curve.

6. The release mechanism as claimed in claim 1, wherein said actuating element comprises a rod having a circular cross section, the diameter (D) of said rod being less than twice the depth (d) of the second slot portion.

7. The release mechanism as claimed in claim 1, the lock body further comprising a spring loaded element mounted for engagement with the actuating element when the actuating element is received in the second slot portion.

8. The release mechanism as claimed in claim 7, wherein the spring loaded element is mounted in an end wall of the first slot portion.

9. The release mechanism as claimed in claim 1, comprising guides for guiding the actuating element in said movement transverse to the first axial direction.

10. The release mechanism as claimed in claim 1, further comprising a housing slidably mounting the locking body.

11. The release mechanism as claimed in claim 10, further: comprising guides for guiding the actuating element in said movement transverse to the first axial direction, wherein said housing comprises a pair of opposed slots receiving opposed ends of said actuating element.

12. The release mechanism as claimed in claim 10, wherein said force transmitting element extends through a first wall of said housing.

13. The release mechanism as claimed in claim 10, wherein said biasing element is a compression spring mounted between a second wall of said housing and said locking body.

14. The release mechanism as claimed claim 13, comprising a rod attached to said locking body and extending through said second wall of said housing, said compression spring being a coil spring mounted around said rod.

15. The release mechanism as claimed in claim 1, comprising at least one actuator attached to said actuating element for moving the actuating element in said second, transverse direction.

16. A ram air turbine release mechanism comprising:
a spring biased locking piston movable between a first position in which the ram air turbine is held in a retracted position and a second position which releases the ram air turbine, said ram air turbine release mechanism; and
a release mechanism comprising:
  a locking body mounted for reciprocating movement in a first axial direction between a locked position and a released position;
  a force transmitting element coupled to the locking body for transmitting a force (F) to said locking body for moving the locking body from the locked position to the released position; and
  a biasing element acting on the locking body in a direction for moving the locking body from the released position towards the locked position;
  said locking body comprising a slot comprising a first slot portion extending in said first direction, and a second slot portion extending transversely from one side of said first slot portion at an end thereof; and
  said slot slidably receiving an actuating element therein, said actuating element being:
    movable in a second direction transverse to said first axial direction,
    received in said second slot portion when the locking body is in the locked position, and
    received in said first slot portion when the locking body is in the released position;
wherein said spring biased locking piston is coupled to the force transmitting element of the release mechanism.

* * * * *